United States Patent [19]
Kaster et al.

[11] Patent Number: 5,893,233
[45] Date of Patent: Apr. 13, 1999

[54] DISPLACEMENT OF ZEBRA MUSSELS

[75] Inventors: Jerry L. Kaster; Diana J. Kaster, both of Bohners Lake, Wis.

[73] Assignee: Board of Regents of the University of Wisconsin System on behalf of the University of Wisconsin-Milwaukee, Milwaukee, Wis.

[21] Appl. No.: 08/237,377

[22] Filed: May 3, 1994

[51] Int. Cl.$^6$ ................................................ A01M 1/20
[52] U.S. Cl. ............................................................ 43/124
[58] Field of Search ............................. 43/124, 6.5, 127, 43/132.1, 99, 100; 210/220, 764; 134/37; 119/204, 216, 235, 232, 243

[56] References Cited

U.S. PATENT DOCUMENTS

| | | | |
|---|---|---|---|
| 4,944,108 | 7/1990 | George et al. | 43/6.5 |
| 5,376,282 | 12/1994 | Chang | 210/750 |
| 5,389,266 | 2/1995 | Clum et al. | 210/747 |
| 5,441,368 | 8/1995 | Campbell et al. | 405/211 |
| 5,444,887 | 8/1995 | Rufolo | 15/104.31 |

*Primary Examiner*—Daniel W. Howell
*Assistant Examiner*—Chuck Y. Mah
*Attorney, Agent, or Firm*—Irving D. Ross, Jr.

[57] ABSTRACT

An air injection technique to evacuate and prevent from settling zebra mussels and other encrustaceous organisms from underwater vertical, horizontal or angular surfaces. Such surfaces located in fresh or salt water may be part of critical underwater components such as metering and monitoring devices.

6 Claims, 4 Drawing Sheets

DISPLACEMENT OF ZEBRA MUSSELS

BACKGROUND OF THE INVENTION

1. Field of Invention

The invention offers a method to control and eliminate the infestation of zebra mussels and other encrustaceous organisms attaching to underwater surfaces, structures, and critical devices. The infestation of these encrustaceous organisms has significant impact on the efficient operation of municipal and industrial facilities, and marine shipping. This zebra mussel problem will expand as it continues to proliferate in estuaries and rivers contiguous to the Great Lakes and other fresh water locations. Marine encrustations historically have been problematic for water users.

2. Description of the Prior Art

This bivalve mollusk *Dreissena polymorpha* commonly known as the zebra mussel colonized Lake St. Clair (Ontario, Canada) in 1986 as a result of ballast water discharge from sea going ships. It is now widely accepted that the zebra mussel has spread to all of the Great Lakes and will eventually inhabit most of the continent's freshwater areas unless a control can be found. The mussels present a problem because they clog water intake areas and equipment, diminishing water flow. It has been estimated that the mollusk could cost the Great Lakes Basin $500 million a year. This problem will continue to expand as the mussel continues to extend its range in estuaries and rivers contiguous with the Great Lakes and elsewhere. The zebra mussel infestation in both estuarine and riverine systems appears to be following the same explosive growth pattern as was evidenced in Lake Erie and other Great Lakes. Moreover, the entire Mississippi River drainage system is thoroughly infested or has an inoculum population of zebra mussels that will impact facilities across the Midwestern and eastern U.S.

The success of invaders and the problems they cause for utility facilities will depend largely on physical parameters like the hydraulic characteristics and availability of colonization sites of in-house underwater structural features. Some potential sites where zebra mussels have become problematic are strainers of all sizes and types including trash racks, metering and monitoring devices, direct connect cylinder recesses, valve recesses, vat and cistern walls, and many other sites. An important application of air injection is to reduce breeding populations of zebra mussels adjacent to water intakes, thereby substantially reducing the influx of veligers to the facility. Design characteristics of a specific device or treatment area will dictate the application and deployment strategy of the air diffuser. The diversity of interference points would ideally be suited by a utilitarian method of zebra mussel control. Air diffusers and injectors will not meet all of the mussel control needs, however, they will be effective for many applications. For clarification, air diffusers deliver a broad band of bubbles whereas air injectors deliver a focused stream of air bubbles. Air "injection" refers to both.

The air injection technique is focused at specific problematic sites in the industrial settling to prevent zebra mussel (*Dreissena polymorpha* Pallas) veligers from settling, and to evacuate adults that have previously colonized. The air injection method has the capacity of eliminating zebra veligers prevented from settling on critical underwater components such as metering and monitoring devices. Air injection is believed to be the first environmentally non-invasive technique to have definitively demonstrated zebra mussel control on a large scale. The principle of the technique and actual apparatus design are remarkably flexible, and thus will integrate well with a variety of different industrial site specific configuration requirements.

SUMMARY OF THE INVENTION

Application of the invention is shown in FIG. 1 and FIG. 2. FIG. 1 shows schematically the basic piping arrangement of the invention located in an underwater environment. Compressed air is introduced at inlet 1 into the closed piping arrangement made up of pipe sections 2, 3, 4, and 5. The pipe sections are joined to each other by pipe elbows. Pipe section 5 which acts as an air diffuser is arranged with a number of orifices 6 providing an outlet for the air pressure contained in pipe section air diffuser 5. The orifice spacing along the diffuser can be spaced according to the air flow required and density of encrustations to be removed. The orifice opening can be drilled to size also depending on the application requirements. Pipe sections can be lengthened or shortened to accommodate the application site. The diffuser pipes, shown here as the lower horizontal pipe, can also be the side pipe (s) of the frame. After the air pressure exits pipe section 5 through the orifices 6 air bubbles are produced rising to surface of the water.

FIG. 2 shows the application of a facing plate 7 to the piping arrangement shown in FIG. 1. Air bubbles produced by pipe section air diffuser 5 are contained between facing plate 7 and surface of wall structure 8 containing the encrusted mollusks attached thereto. The facing plate 7 can be attached to the pipe sections and its size will vary to accommodate the specific application. The facing plate 7 ensures maximum interference between the diffused air and the encrusted organisms such as zebra mussels.

FIG. 3 is a photograph of an underwater piling to which is attached a field colony of zebra mussels at a density of 3,694 per square meter.

FIG. 4 is a photograph of the same area as shown in FIG. 3 five days after application of the air injection technique. Density is 0 per square meter.

The air injection concept and principle of action is clear: 1) Air injection prevents mussels form opening their valves and thus retarding their feeding by exerting a two-phase alternating frictional force of water and air bubbles on the soft siphon tissues; 2) It exerts the alternating water-bubble frictional impact directly on the shell of the mussel thereby demanding continual counteraction by the byssal-foot apparatus, resulting in an unacceptable energy demand placed on the mussel to stay in position.

This air injection technique also has application in eliminating and discouraging the growth of marine fouling organisms and aquatic creatures onto a ship's hull. The organisms includes tubeworms, barnacles, oysters, sea mussels, and other crustaceans. Referring to FIG. 5 and FIG. 5A the application consists of retrofitting an air diffuser pipe 10 or pipes to the underside of the ship's hull 11 adjacent to the ship's center keel 12.

The seawall at the Great Lakes Research Facility of the University of Wisconsin-Milwaukee served as the field experimental site for application of the invention. Field numbers from $3.694/m^2$ to $0/m^2$ after five days of treatment using 25 psi, 5 psi pressure differential, and <9/foot of diffuser. Extensive areas of the seawall can be treated as the air injection device is moved along the wall. All attempts at zebra mussel removal using the method produced equally dramatic results. The cost of producing low pressure air supplies is relatively inexpensive and compressors of all sizes and a variety of pressure control units are readily available commercially.

PREFERRED EMBODIMENT

Figure 1:
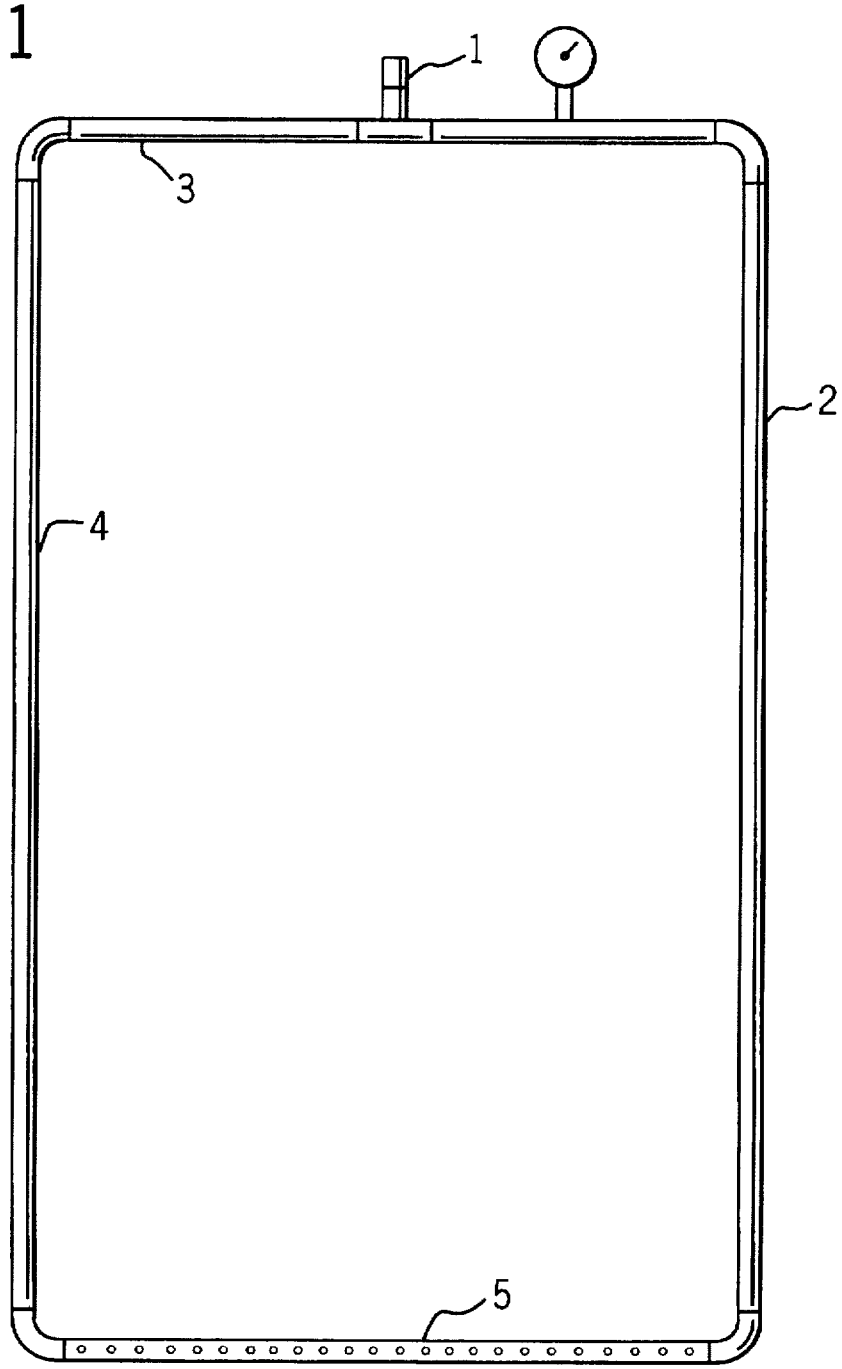
FIG. 1 Air Diffuser Piping
Figure 1:
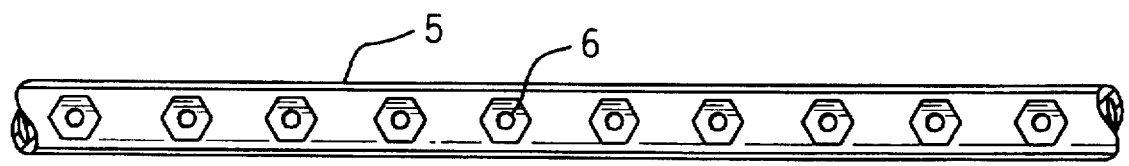
Figure 2:
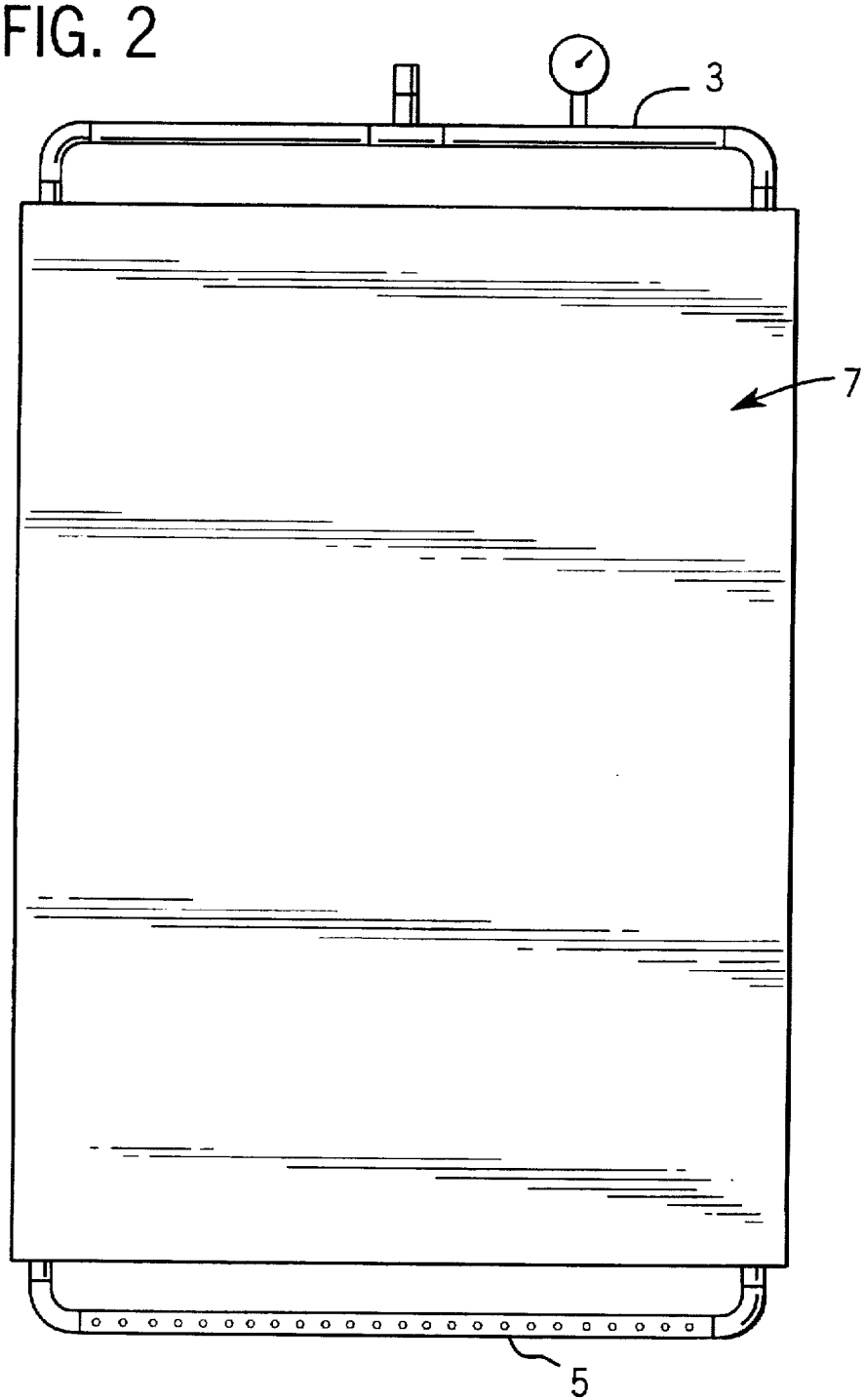
FIG. 2 Air Diffuser Piping with Facing Plate
Figure 2:
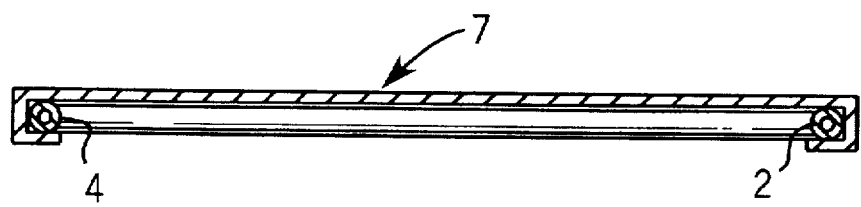
Figure 3:
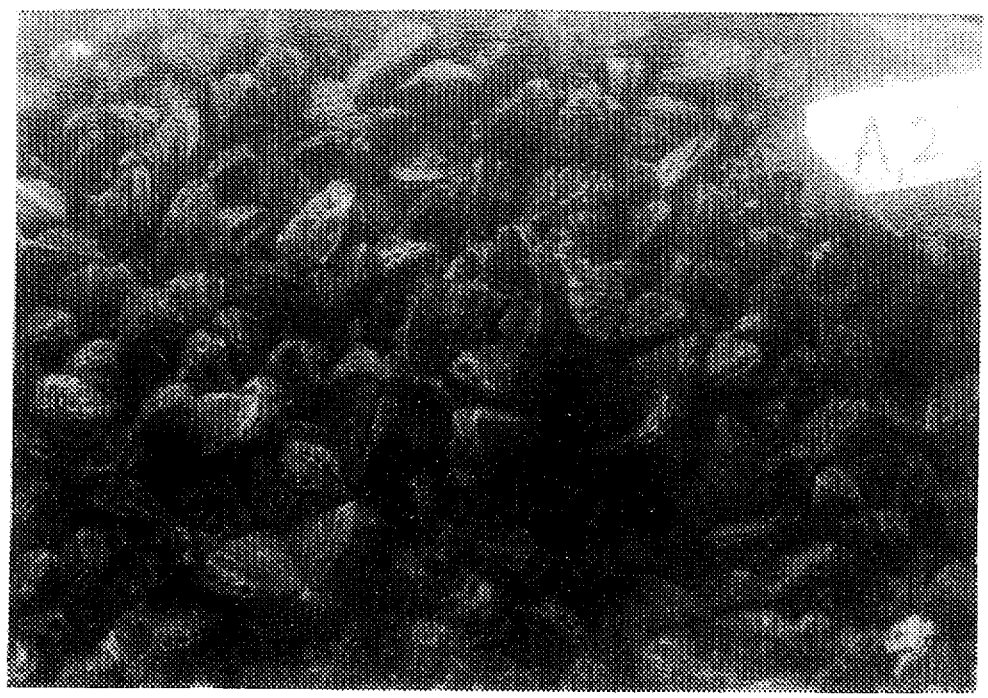
FIG. 3 Zebra Mussels Attached to Underwater Piling
Figure 4:
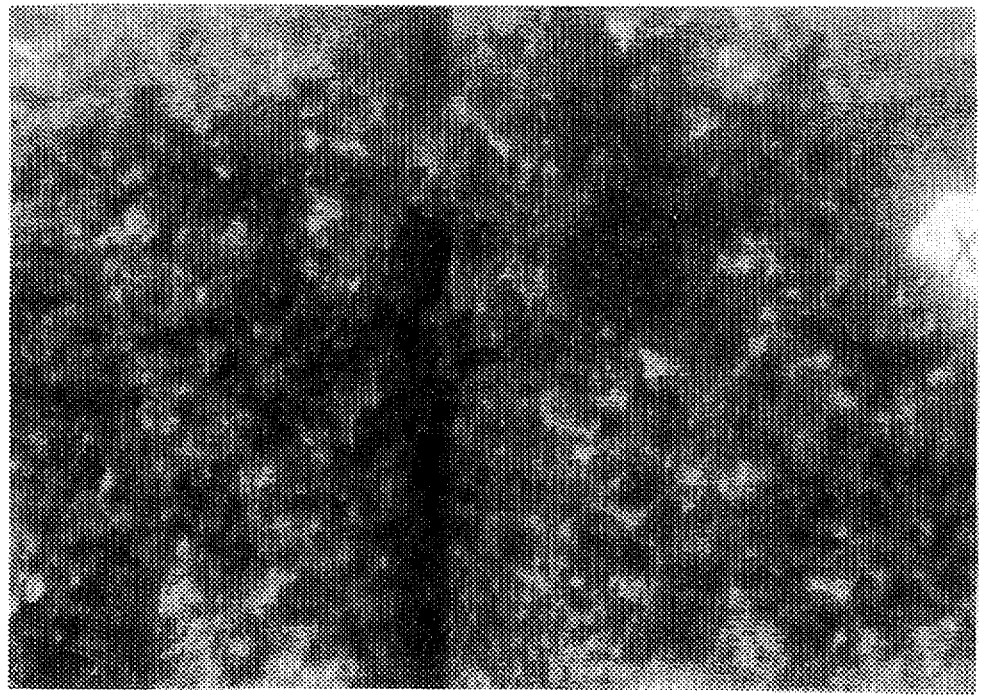
FIG. 4 Underwater Piling After Air Injection
Figure 5:
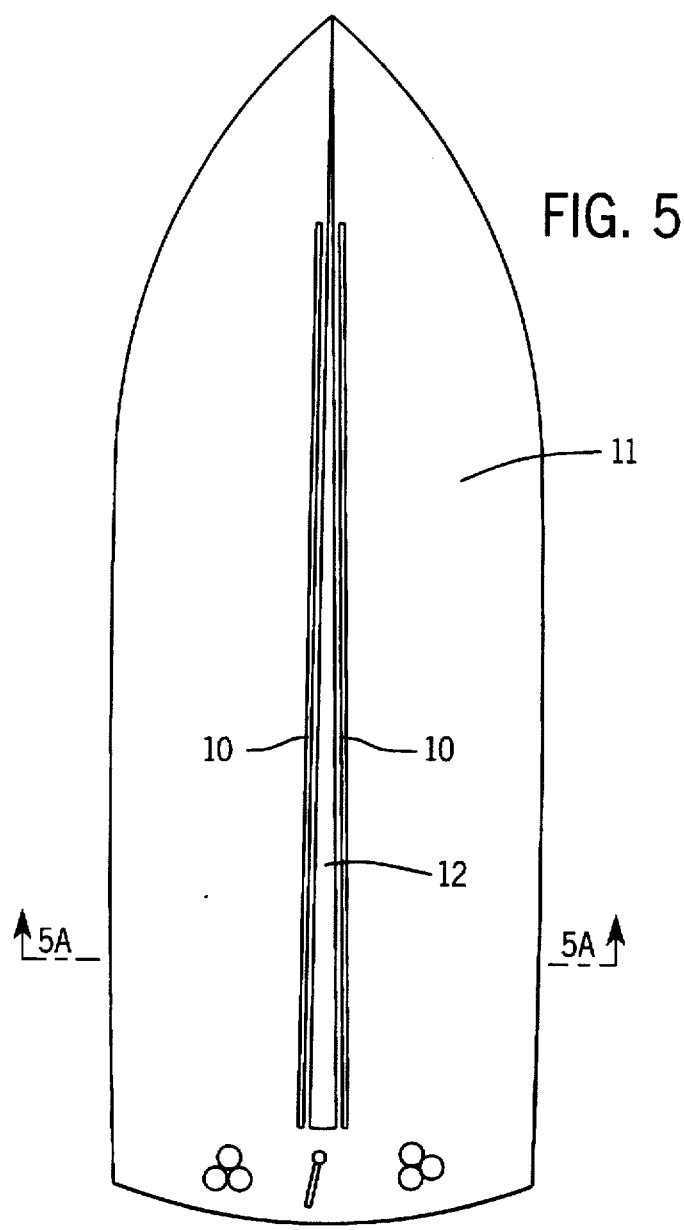
FIG. 5 Air Diffuser Applied to Ship Hull
Figure 5A:
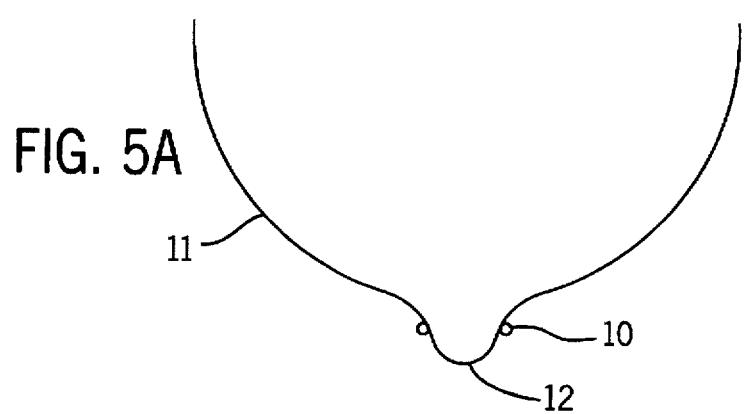
FIG. 5A Section Through Ship's Hull

The preferred embodiment is depicted in FIG. 1 and FIG. 2. Referring to FIG. 1 the diffuser 5 is connected by way of submerged pipe sections 2, 4 and 3 to a compressed air supply at inlet 1. Pressurized air flows through pipes 2, 3, and 4 to diffuser 5 where the pressurized air flow through orifices to form air bubbles in the surrounding water. Air diffuser 5 is positioned, in the preferred embodiment, at the base of an underwater wall or structure to which encrustations have attached.

Referring to FIG. 2 an aluminum sheet is employed to construct facing plate 7. The edge portions of the facing plate 7 are formed by two 90° bends around the pipe sections 2 and 4. The configuration of the facing plate 7 thus formed permits sliding of the facing plate 7 in a vertical direction relative to the pipe sections.

The size of the facing plate 7 in the preferred embodiment is in the range of 20 feet vertical and 5 horizontal, although this can vary widely to meet a specific application.

Experiments have shown that 3–5 days of operation are required to remove heavy zebra mussel encrustations using up to 2 standard cubic feet per minutes (SCFM) air usage. A pressure differential of 5 pounds per square inch (PSI) exists between the air inlet and the diffuser. The entire air diffuser apparatus consisting of the pipe sections, air diffuser pipe and facing plate can be successively moved to adjacent areas thereby removing encrustations from large areas such as seawalls, trash racks, cisterns, ship hulls and the like. Depending on the application, the diffuser can run continuously or intermittently.

We claim:

1. A method to remove encrustaceous organisms from underwater fixed structures and surfaces containing encrustaceous organisms attached thereto comprising introducing compressed air into at least one underwater pipe section containing multiple orifices, creating air bubbles from said compressed air passing through said orifices and directing said bubbles to said fixed structures and surfaces by means of a facing plate.

2. The method of claim 1 where said encrustaceous organisms are zebra mussels.

3. The method of claim 1 where said pipe section containing multiple orifices is located at the base of said underwater fixed structure.

4. The method of claim 1 where said underwater pipe section containing multiple orifices is located adjacent to the keel of a ship's hull.

5. The method of claim 1 where said underwater fixed structures and surfaces are metering and monitoring devices.

6. A method to remove encrustaceous organisms from underwater fixed structures and surfaces containing encrustaceous organisms attached thereto comprising introducing compressed air into at least one underwater pipe section containing multiple orifices and locating said pipe section adjacent to said structures and surfaces and creating air bubbles from said compressed air passing through said orifices.

* * * * *